United States Patent [19]
Pfister

[11] 3,921,450
[45] Nov. 25, 1975

[54] SURFACE LEVEL MEASURING DEVICE

[75] Inventor: Karl Pfister, Nurnberg, Germany

[73] Assignee: Kraftwerk Union Aktiengesellschaft, Mulheim (Ruhr), Germany

[22] Filed: Feb. 13, 1974

[21] Appl. No.: 442,134

[30] Foreign Application Priority Data
Feb. 22, 1973 Germany............................ 2308823

[52] U.S. Cl................................. 73/295; 338/24
[51] Int. Cl.².......................................... G01F 23/22
[58] Field of Search............ 73/295, 304 R; 338/23, 338/24

[56] References Cited
UNITED STATES PATENTS

| | | | |
|---|---|---|---|
| 2,456,617 | 12/1948 | Burch | 73/295 |
| 3,302,458 | 2/1967 | Scadron | 73/295 |
| 3,324,722 | 6/1967 | Reicks | 73/295 |
| 3,485,100 | 12/1969 | Petersen | 73/295 |

*Primary Examiner*—Richard C. Queisser
*Assistant Examiner*—Frederick Shoon
*Attorney, Agent, or Firm*—Herbert L. Lerner

[57] ABSTRACT

Surface level measuring device includes a measuring sensor heatable to a given temperature and insertable into a liquid, the surface level of which is to be measured, whereby the given temperature of the measuring sensor is changed, and means for determining the surface level of the liquid in accordance with the change in the given temperature, the measuring sensor including a sheathed conductor formed with a resistance wire having a temperature-dependent resistance and a heating wire traversible by an electric current, and a support rod having projections extending therefrom, the sheathed conductor being wound around the support rod in engagement with the projections.

5 Claims, 6 Drawing Figures

SURFACE LEVEL MEASURING DEVICE

The invention relates to a surface level measuring device. In vessels filled with liquid, it is often necessary to maintain an accurate liquid level indication. Particularly in nuclear reactor power plants, there are vessels filled with liquid wherein no smooth or calm liquid surface is present and wherein accurate monitoring of the liquid level is necessary for timely detection of hazardous operating conditions.

A liquid-level indicating device is known from the German Published Prosecuted Application DAS 1,254,375, wherein a temperature measuring sensor is secured on a support rod which is heated by a sheathed conductor wound around the support rod and traversed by an electric current. For attaining a stepwise varying measuring value, there are provided several temperature measuring sensors that are disposed one above the other. In this heretofore known device, the temperature reduction at the measuring points resulting from the immersion thereof in the liquid whose surface level is being measured is utilized to obtain an indication as to whether the temperature measuring points are located in the liquid or in the space located above the liquid surface.

It is an object of the invention of the instant application to provide a surface level measuring device which will provide accurate and continuous indication of a liquid surface level for vessels wherein the liquid level is in a perturbed or non-calm state.

With the foregoing and other objects in view, there is provided in accordance with the invention, a surface level measuring device comprising a measuring sensor heatable to a given temperature and insertable into a liquid, the surface level of which is to be measured, whereby the given temperature of the measuring sensor is changed, and means for determining the surface level of the liquid in accordance with the change in the given temperature, the measuring sensor comprising a sheathed conductor formed with a resistance wire having a temperature-dependent resistance and a heating wire traversible by an electric current, and a support rod having projections extending therefrom, the sheathed conductor being wound around the support rod in engagement with the projections.

Although the invention is illustrated and described herein as embodied in surface level measuring device, it is nevertheless not intended to be limited to the details shown since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
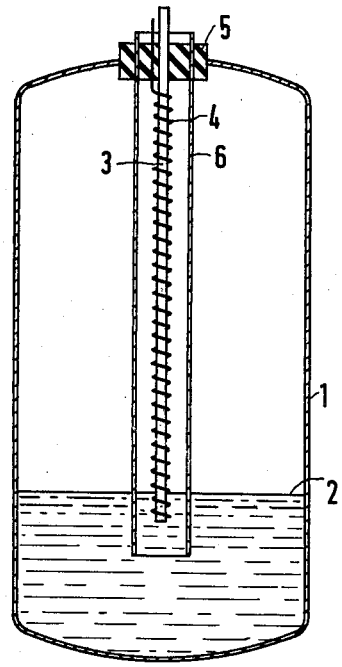
FIG. 1 is a diagrammatic vertical sectional view of a surface level measuring device constructed in accordance with the invention, and including a support rod extending into a vessel whose contents have a surface, the level of which is to be measured.

Referring now to the drawing and first, particularly, to FIG. 1 thereof, there is shown therein a vessel 1 in which a liquid 2 is received. A support rod 3 extends into the liquid 2 in the vessel 1 from above, and is provided with a sheathed conductor 4 that is sinuously wound thereon. The support rod 3 together with the sheathed conductor 4 wound thereon are retained in a sealing closure member or stopper 5 which closes an opening formed in the vessel 1. In the embodiment illustrated in FIG. 1, the conductor-wound support rod 3 is surrounded by a tube 6 which protects it from violent splashes of the liquid 2.

Figure 2:
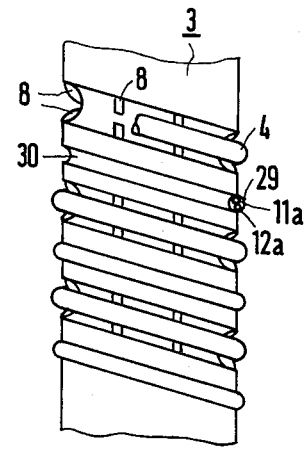
FIG. 2 is an enlarged fragmentary view of FIG. 1 showing the support rod with a heated and an unheated sheathed conductor wound thereon.

FIG. 2 illustrates the manner in which the sheathed conductor 4 is wound on the support rod 3. As is readily apparent in FIG. 2 as well as in FIG. 3, the heated sheathed conductor 4 is retained in a helical or sinuous notch or indentation 7 formed in the support rod 3 and having a semicircular cross section. The helical notch 7 is provided with projections 8 engaged by the sheathed conductor 4. The result of this construction is that no water film can form between the sheathed conductor 4 and the base of the helical notch 7 and that only slight heat transfer thereby occurs between the sheathed conductor 4 and the support rod 3. In the embodiment of FIG. 2, an unheated sheathed conductor 29 is additionally wound on the support rod 3. The unheated sheathed conductor 29 is in direct engagement with another helical or sinuous notch 30 formed in the rod 3 and having a semicircular cross section that is smaller than the semicircular cross section of the helical notch 7.

Figure 3:
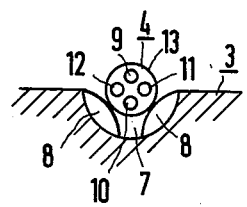
FIG. 3 is a further enlarged fragmentary cross-sectional view of FIG. 2 showing the inner construction of one of the sheathed conductors.
Figure 4:
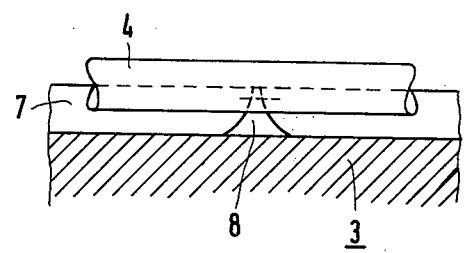
FIG. 4 is a longitudinal sectional view of FIG. 3.

As shown more particularly in FIGS. 3 and 4, the helical notch 7 is provided with projections 8 that are engaged by the heated sheathed conductor 4. It is also apparent from FIG. 4, current-conducting wires 9, 10, 11 and 12, which are insulated from one another, are disposed in the sheathed conductor 4. Two of the four wires, namely heating wires 9 and 10, are connected to an alternating current source and are connected one with the other either in parallel or in series. The use of two heating wires provides the advantage that adjustment can be made to an optimum heat transfer between the individual wires and the sheathing 13 of the sheathed conductor 4. The reactive speed of the measuring device of the invention is thereby increased. The resistance wires 11 and 12 are formed of a material having a high temperature-dependent electrical resistance.

Figure 5:
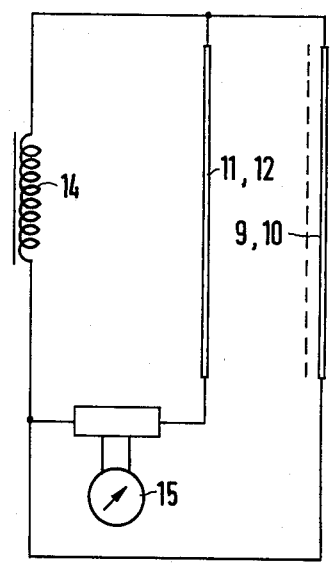
FIG. 5 is a circuit diagram for the resistance wire of the sheathed conductor without any bridge circuit.

In FIG. 5 there is shown a simple circuit for the resistance wires 11 and 12 and the heating wires 9 and 10. Whereas the heating wires 9 and 10 are directly connected to an alternating current source 14, a current measuring device 15 is electrically connected between the resistance wires 11 and 12, on the one hand, and the alternating current source 14, on the other hand. The current set in the current measuring device 15 is dependent upon the temperature in the resistance wires 11 and 12, and thereby furnishes a measure or gauge of the liquid level in the vessel 1. Instead of the four wires in the sheathed conductor 4, it is adequate also to provide only one resistance wire and one heating wire in the sheathing.

If different temperatures prevail in the vessel, the liquid level of which is to be monitored or measured, there can be provided on the support rod 3, as shown in FIG. 2, an unheated sheathed conductor 29 in addition to the heated sheathed conductor 4. Only resistance wires 11a and 12a (note FIG. 6) are provided in the unheated sheathed conductor 29.

Figure 6:
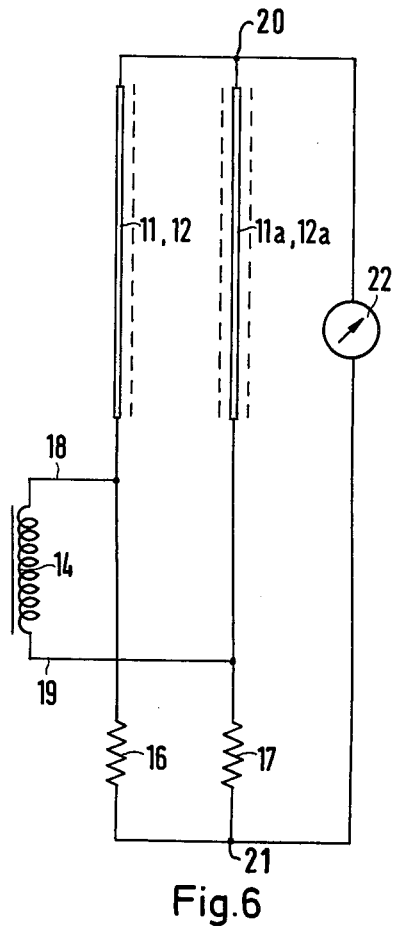
FIG. 6 is a circuit diagram for the resistance wire with a bridge circuit and unheated sheathed conductor to compensate for temperature variations in the vessel.

As further illustrated in FIG. 6, the resistance wires 11 and 12 of the heated and the resistance wires 11a and 12a of the unheated sheathed conductors are connected together with constant resistances 16 and 17 into a bridge circuit. The bridge circuit is connected through lines 18 and 19 to the voltage source 14. The measuring points 20 and 21 of the bridge circuit are connected to a voltage measuring instrument 22. The bridge is balanced when the ratio of the resistance values of the resistance wires 11 and 12 to the resistance values of the resistance wires 11a and 12a is the same as the ratio of the resistance value of the resistance 16 to that of the resistance 17. This is the case when the vessel 1 is completely filled with water, for example, and no temperature difference exists between the resistance wires in the heated and the unheated sheathed conductors. The voltage between the measuring points 20 and 21 will increase in value as the liquid level descends, because the resistance wires in the heated sheathed conductor 4 then partly project out of the liquid and take on a higher temperature which changes the resistance of these resistance wires, whereas the resistance of the resistance wires 11a and 12a in the unheated covered conductor 9 is not affected.

A temperature change in the vessel 1, however, affects the resistance wires in the heated and the unheated covered conductors to be the same extent and, consequently, does not cause any change in the surface level indication in the measuring device 22.

I claim:

1. Surface level measuring device comprising a measuring sensor heatable to a given temperature and insertable into a liquid, the surface level of which is to be measured, whereby the given temperature of said measuring sensor is changed, and means for determining the surface level of the liquid in accordance with the change in the given temperature, said measuring sensor comprising a sheathed conductor formed with a resistance wire having a temperature-dependent resistance and a heating wire distinct from said resistance wire traversible by an electric current, and a support rod having projections extending therefrom, said sheathed conductor being wound around said support rod in engagement with said projections.

2. Surface level measuring device according to claim 1 wherein the liquid is received in a vessel, and including a second sheathed conductor wound around said support rod, said second sheathed conductor formed with a resistance wire for compensating for the temperature of the vessel, said resistance wire of said second sheathed conductor being connected in a bridge circuit with the resistance wire of the first-mentioned sheathed conductor heatable by the heating wire thereof.

3. Surface level measuring device according to claim 1 wherein said support rod is formed with a helical notch, said projections extending out of said helical notch.

4. Surface level measuring device comprising a measuring sensor heatable to a given temperature and insertable into a liquid, the surface level of which is to be measured, whereby the given temperature of said measuring sensor is changed, and means for determining the surface level of the liquid in accordance with the change in the given temperature, said measuring sensor comprising a sheathed conductor formed with a plurality of resistance wires having a temperature-dependent resistance and a plurality of heating wires traversible by an electric current, and a support rod having projections extending therefrom, said sheathed conductor being wound around said support rod in engagement with said projections.

5. Surface level measuring device for determining the surface level of a body of liquid comprising a carrier rod, a plurality of sheathed conductors serving as a measuring sensor wound around said carrier rod, at least one said sheathed conductor being a heating wire traversible by an electric current and at least one conductor formed of resistance wire, distinct from said heating wire, having a temperature-dependent resistance and at least one unheated sheathed conductor formed of resistance wire having a temperature-dependent resistance, said heated and unheated sheathed conductors wound around said carrier rod extending below and above said surface level of said body of liquid when said carrier rod is disposed in said body of liquid, a bridge circuit for comparing the resistance value of said heated conductor having a temperature-dependent resistance with the resistance of said resistance wire of said unheated conductor, said heated and unheated sheathed conductors both being exposed to the temperatures above and below the surface level in the vessel whose liquid level is to be measured, said resistance wire having a temperature-dependent resistance of said heated sheathed conductor being disposed in a bridge branch and said resistance wire of said unheated sheathed conductor being disposed in another bridge branch of the resistance measuring bridge.

* * * * *